(12) United States Patent
Taga et al.

(10) Patent No.: US 7,393,399 B2
(45) Date of Patent: Jul. 1, 2008

(54) INK FOR INK-JET RECORDING

(75) Inventors: Yasuhiro Taga, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/849,640

(22) Filed: Sep. 4, 2007

(65) Prior Publication Data

US 2008/0066645 A1    Mar. 20, 2008

(30) Foreign Application Priority Data

Sep. 19, 2006    (JP) .............................. 2006-252222

(51) Int. Cl.
 *C09D 11/00*    (2006.01)
 *C09D 11/02*    (2006.01)
(52) U.S. Cl. ................ 106/31.78; 106/31.28; 106/31.49
(58) Field of Classification Search ............. 106/31.78, 106/31.28, 31.49
 See application file for complete search history.

(56) References Cited

U.S. PATENT DOCUMENTS 4,786,327 A * 11/1988 Wenzel et al. ............. 106/31.43
6,514,330 B1    2/2003 Kanaya et al.
6,648,463 B2 * 11/2003 Koga et al. ................ 106/31.27
7,297,198 B1 * 11/2007 Taga et al. ................ 106/31.49
7,303,617 B1 * 12/2007 Taga et al. ................ 106/31.49
7,303,618 B1 * 12/2007 Taga et al. ................ 106/31.49
2006/0127272 A1 * 6/2006 Saitmacher et al. ........... 422/28

FOREIGN PATENT DOCUMENTS

| JP | 59129272 | 7/1984 |
|----|----------|--------|
| JP | 63210175 | 8/1988 |
| JP | 2024367  | 1/1990 |
| JP | 8113744  | 5/1996 |
| JP | 8218020  | 8/1996 |
| JP | 20000355665 | 12/2000 |

* cited by examiner

*Primary Examiner*—Helene Klemanski
(74) *Attorney, Agent, or Firm*—Banner & Witcoff, Ltd.

(57) ABSTRACT

An ink for ink-jet recording contains a copper phthalocyanine pigment as a colorant, and a thiazole compound. The ink further contains a metallic phthalocyanine compound having one or more counter ions, wherein about 2 mol % to about 20 mol % of the counter ions is ammonium ion and/or organic ammonium ion.

20 Claims, No Drawings

INK FOR INK-JET RECORDING

CROSS REFERENCE TO RELATED APPLICATION

This application claims the benefit of Japanese Patent Application No. 2006-252222, filed Sep. 19, 2006, which is incorporated herein by reference in its entirety.

BACKGROUND

One important characteristic of an ink for ink-jet recording is good ozone resistance. This means to prevent discoloration (degradation of image quality) of printed matter by ink-jet recording attributable to contact with the ozone in air. Copper phthalocyanine dyes, which often are used as colorants for cyan colored inks, have good light fastness as compared with dyes typically used for magenta and yellow colors. However, many copper phthalocyanine dyes have inadequate ozone resistance. Some copper phthalocyanine pigments have been developed which have good light fastness as well as ozone resistance.

Another important characteristic of an ink for ink-jet recording is resistance to mildewing. When mildew is generated, it becomes a foreign matter, so that ejecting stability at the nozzle of ink-jet head is decreased and the nozzle can become clogged. Accordingly, a thiazole compound can be added to the ink as a mildew proofing agent whether or not a copper phthalocyanine pigment is used as a colorant.

Although generation of mildew can be restrained in the ink to which a thiazole compound as a mildew proofing agent is added, another problem arises with generation of precipitates. This tendency is especially conspicuous when a copper phthalocyanine pigment is used as a colorant. Further, an anticorrosive agent such as a benzotriazole compound is sometimes additionally compounded to the ink for the prevention of corrosion of metallic materials that are brought into contact with the ink in the ink passage of ink-jet head. The anticorrosive agent can further contribute to the generation of precipitates.

SUMMARY

An ink for ink-jet recording may have good mildew resistance, good ozone resistance, and may avoid generating precipitates, even when a copper phthalocyanine pigment is used as a colorant and a thiazole compound is used.

DETAILED DESCRIPTION

General Overview

It was found that one or more of the above aspects may be achieved by adding, to ink-jet recording ink using a thiazole compound and a copper phthalocyanine pigment as a colorant, a metallic phthalocyanine compound having one or more counter ions, wherein ammonium ion, organic ammonium ion, or a combination thereof accounts for a specific ratio of the counter ions.

Illustrative Aspects

Illustrative aspects will be described. These aspects merely provide examples, and it is needless to say that the aspects can be suitably modified without departing from the gist of the invention.

In accordance with one aspect, an ink for ink-jet recording containing a thiazole compound and a copper phthalocyanine pigment, further contains a metallic phthalocyanine compound having one or more counter ions, wherein about 2 mol % to about 20 mol % of the counter ions is ammonium ion, organic ammonium ion, or a combination thereof.

The ink for ink-jet recording may contain a thiazole compound, and a copper phthalocyanine pigment as the colorant.

The copper phthalocyanine pigment is a non-water-soluble colorant coordinating a copper at the center of a phthalocyanine skeleton. Examples of the copper phthalocyanine pigment include, but are not limited to, C.I. Pigment Blue 15:x (x is an integer of 1 to 6), C.I. Pigment Green 7, C.I. Pigment Green 36, and the like. In the point of hue, C.I. Pigment Blue 15:1, C.I. Pigment Blue 15:3, C.I. Pigment Blue 15:6, and the like may be suitable.

The ink for ink-jet recording may further contain a metallic phthalocyanine compound, wherein about 2 mol % to about 20 mol %, often about 2 mol % to about 15 mol %, of the counter ions is ammonium ion ($NH_4^+$), organic ammonium ion, or a combination thereof. The metallic phthalocyanine compound may be added in order to prevent generation of precipitates, but many metallic phthalocyanine compounds also serve as dyes in themselves. Examples of the metals to be coordinated include, but are not limited to, Al, Cu, Ni, Fe, Co, and the like. But in view of hue and a color, Cu may be suitable.

The ammonium ion and/or organic ammonium ion in the counter ions of the metallic phthalocyanine compound usually ranges from about 2 mol % to about 20 mol %. If the amount is less than about 2 mol %, it is difficult to effectively restrain generation of precipitates believed to result from the thiazole compound, and ejecting stability of the ink for ink-jet recording may be decreased. When the amount exceeds about 20 mol %, precipitates are more likely to be generated from rubber members in the ink-jet recording device. When about 2 mol % to about 20 mol % of the counter ions is ammonium ion and/or organic ammonium ion, generation of precipitates may be restrained even when an anticorrosive agent of a benzotriazole compound is used.

The organic ammonium ion may be obtained by substituting the hydrogen(s) of $NH_4^+$ with 1 to 4 alkyl group(s) (a methyl group, an ethyl group, and the like) or hydroxylalkyl group(s) (a hydroxymethyl group, a hydroxyethyl group, and the like). Examples of the organic ammonium ion include, but are not limited to, a monomethylammonium ion, a dimethylammonium ion, a trimethylammonium ion, a tetramethylammonium ion, and the like.

The counter ions of a metallic phthalocyanine compound may be substituted with ammonium ion ($NH_4^+$) and/or organic ammonium ion by treating a metallic phthalocyanine compound having a counter ion such as an alkali metal ion with aqueous ammonia and/or an aqueous solution of organic ammonium hydroxide. The amount of the counter ions in a metallic phthalocyanine compound may be measured with a commercially available cation chromatography apparatus.

A suitable metallic phthalocyanine compound may be a copper phthalocyanine dye in which about 2 mol % to about 20 mol % of the counter ions is ammonium ion ($NH_4^+$) and/or organic ammonium ion.

Suitable copper phthalocyanine dyes include, but are not limited to, C.I. Direct Blue 86, C.I. Direct Blue 199, and the like. In the points of a color and light fastness, C.I. Direct Blue 199 may be suitable.

C.I. Direct Blue 199 may be, for example, a copper phthalocyanine dye represented by the following general formula (1).

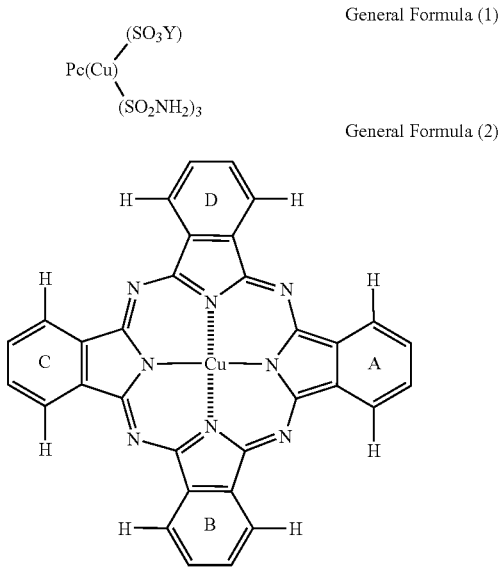

General Formula (1)

General Formula (2)

In the general formula (1), Pc(Cu) represents a copper phthalocyanine nucleus represented by the general formula (2); and substituent $SO_3Y$ group (where Y represents a counter ion; Y includes, but are not limited to, a hydrogen ion, a lithium ion, a sodium ion, a potassium ion, an ammonium ion, an organic ammonium ion, or the like). Substituent $SO_3Y$ group and each substituent $SO_2NH_2$ group are present on any of the four benzene rings A, B, C and D in the copper phthalocyanine nucleus represented by the general formula (2).

C.I. Direct Blue 199 may be produced by known methods, for example, by a known copper phthalocyanine substitution method containing the following steps (i) and (ii).

Step (i): A copper phthalocyanine may be chlorosulfonated with a chlorosulfonating agent. For example, a mixture of chlorosulfonic acid and a chlorinating agent (phosphorus oxychloride or phosphorus trichloride) may be used as the chlorosulfonating agent. The molar ratio of the chlorosulfonic acid to the copper phthalocyanine compound (chlorosulfonic acid:copper phthalocyanine compound) may be within the range of about 5:1 to about 200:1. The molar ratio of the chlorinating agent to the copper phthalocyanine (chlorinating agent:copper phthalocyanine) may be within the range of about 0.5:1 to about 10:1.

This chlorosulfonating reaction may be carried out at a temperature ranging about 90° C. to about 180° C. for about 0.5 hours to about 16 hours. The reaction time of the chlorosulfonating reaction generally depends upon the reaction temperature. When the reaction temperature is higher, the reaction time usually is shorter. When the reaction temperature is lower, the reaction time usually is longer. The more suitable temperature and time for chlorosulfonating reaction may be in the range of about 135° C. to about 145° C. for about 1.5 hours to about 5 hours.

Further, the chlorosulfonating agent may contain a sulfuric acid. When the chlorosulfonating agent contains a sulfuric acid, the molar ratio of the sulfuric acid to the copper phthalocyanine compound (sulfuric acid:copper phthalocyanine compound) may be within the range of about 0.3:1 to about 2:1.

Step (ii): Subsequently, the product obtained in step (i) may be condensed with ammonia and/or organic amine so that at least a part of the counter ions becomes ammonium ion or organic ammonium ion to obtain C.I. Direct Blue 199 in which about 2 mol % to about 20 mol % of the counter ions is ammonium ion and/or organic ammonium ion.

Examples of this step are carried out using about 3 wt. % to about 35 wt. % of ammonium hydroxide and/or organic ammonium hydroxide at a reaction temperature of about 0° C. to about 50° C. Generally, the reaction time depends upon the reaction temperature. When the reaction temperature is higher, the reaction time usually is shorter. When the reaction temperature is lower, the reaction time usually is longer. The more suitable temperature and time for condensation reaction may be in the range of about 0° C. to about 45° C. for about 0.5 hours to about 24 hours.

The amount of the copper phthalocyanine pigment in the ink may be determined according to the performance and characteristics required of the ink. The amount of the copper phthalocyanine pigment usually is about 0.05 wt. % to about 5 wt. % based on the total weight of the ink. Other colorants may also be used in combination.

In the ink, the copper phthalocyanine pigment usually is added as a pigment dispersion obtained by dispersing in an aqueous medium with a dispersant or a surfactant. Dispersants conventionally used in the preparation of a pigment dispersion, for example, polymer dispersants may be used. The polymer dispersants include natural polymers and synthetic polymers. Examples of natural polymers include, but are not limited to, protein such as glue, gelatin, casein, albumin, and the like; natural rubber such as gum arabic, tragacanth gum, and the like; glucoside such as saponin, and the like; alginic acid derivative such as alginic acid, propylene glycol alginate ester, triethanolamine alginate, ammonium alginate, and the like; cellulose derivative such as methyl cellulose, carboxymethyl cellulose, hydroxyethyl cellulose, ethylhydroxy cellulose, and the like. Examples of synthetic polymers include, but are not limited to, polyvinyl alcohol; polyvinyl pyrrolidone; acrylic resin such as polyacrylic acid, acrylic acid-acrylonitrile copolymer, potassium acrylate-acrylonitrile copolymer, vinyl acetate-acrylic ester copolymer, acrylic acid-acrylic ester copolymer, and the like; styrene-(meth)acrylic resin such as styrene-acrylic acid copolymer, styrene-methacrylic acid copolymer, styrene-methacrylic acid-acrylic ester copolymer, styrene-α-methylstyrene-acrylic acid copolymer, styrene-α-methylstyrene-acrylic acid-acrylic ester copolymer, and the like; vinyl acetate copolymer such as vinyl acetate-ethylene copolymer, vinyl acetate-fatty acid vinyl ethylene copolymer, vinyl acetate-maleic ester copolymer, vinyl acetate-crotonic acid copolymer, vinyl acetate-acrylic acid copolymer, and the like; styrene-maleic acid copolymer; styrene-maleic anhydride copolymer; vinyl naphthalene-acrylic acid copolymer; vinyl naphthalene-maleic acid copolymer; and salts of these polymers. Of these polymers, copolymers of a monomer having a hydrophobic group and a monomer having a hydrophilic group, and polymers comprising a monomer having both a hydrophobic group and a hydrophilic group in the molecular structure may be especially suitable.

The total amount of the copper phthalocyanine pigment and the metallic phthalocyanine compound to the amount of the ink usually is about 0.1 wt. % to about 5 wt. % based on the total weight of the ink.

In connection with the weight ratio of the copper phthalocyanine pigment to the metallic phthalocyanine compound in the ink, ozone resistance generally is decreased when the ratio of the copper phthalocyanine pigment is relatively small. One the other hand, precipitation may not be effectively restrained when the ratio is too large. The weight ratio usually is about 70:30 to about 95:5.

The ink contains a thiazole compound. The thiazole compound serves as a mildew proofing agent. Examples of the thiazole compounds include, but are not limited to, benzisothiazoline, isothiazoline, 1,2-benzisothiazoline-3-one, 5-chloro-2-methyl-4-isothiazolin-3-one, 2-(thiocyanomethylthio)benzothiazole, 2-mercaptobenzothiazole, 3-allyloxy-1,2-benzisothiazole-1,1-oxide, and the like. The thiazole-based mildew proofing agent includes, but is not limited to, Proxel series (BDN, BD20, GXL, LV, XL2, Ultra 10, and the like, manufactured and sold by Arch Chemicals Inc.).

The amount of the thiazole compound in the ink usually is at least a minimum amount that provides a mildew proofing effect. Excessive amounts may increase the likelihood that precipitates may be generated. Given these considerations, the amount of the thiazole compound usually is about 10 ppm to about 500 ppm, often about 100 ppm to about 500 ppm, based on the total weight of the ink.

The ink may further contain a benzotriazole compound as an anticorrosive agent for the prevention of rusts ascribable to contact of the ink with the metallic members constituting ink-jet heads (in particular, a 42 alloy (a nickel-iron alloy containing 42% of nickel)). Examples of benzotriazole compounds include, but are not limited to, 1H-benzotriazole, 4-methyl-1H-benzotriazole, 5-methyl-1H-benzotriazole, sodium salts of these benzotriazole compounds, potassium salts of these benzotriazole compounds, and the like.

The amount of the benzotriazole compound in the ink usually is at least a minimum amount that provides a rust preventing effect. Excessive amounts may increase the likelihood that precipitates may be generated. Given these considerations, the amount of the benzotriazole compound usually ranges from 0 wt. % to about 0.5 wt. %, often from about 0.01 wt. % to about 0.5 wt. %, and sometimes from about 0.01 wt. % to about 0.2 wt. %, based on the total weight of the ink.

Water and water-soluble organic solvents that are the constituents of the ink are described below.

Ion exchange water which has low salts may be suitable. The amount of water in the ink depends upon the amount of other components, and usually ranges from about 10 wt. % to about 90 wt. %, often from about 40 wt. % to about 80 wt. %, based on the total weight of the ink.

A water-soluble organic solvent may contain a humectant mainly for preventing drying of the ink at the tip of the nozzle of ink-jet head, and/or a penetrant mainly for controlling drying speed of ink on recording paper.

Examples of humectants include, but are not limited to, lower alcohols such as methyl alcohol, ethyl alcohol, n-propyl alcohol, isopropyl alcohol, n-butyl alcohol, sec-butyl alcohol, tert-butyl alcohol, and the like; polyhydric alcohols such as 1,3-butanediol, 1,5-pentanediol, 1,6-hexanediol, glycerin, 1,2,6-hexanetriol, 1,2,4-butanetriol, 1,2,3-butanetriol, pentantriol, and the like; alkylene glycol such as ethylene glycol, diethylene glycol, triethylene glycol, propylene glycol, dipropylene glycol, tripropylene glycol, butylene glycol, thiodiglycol, hexylene glycol, and the like; polyalkylene glycol such as polyethylene glycol, polypropylene glycol, and the like; amide such as formamide, N-methylformamide, N,N-dimethylformamide, dimethylacetamide, and the like; amine such as monoethanolamine, diethanolamine, triethanolamine, monoethylamine, diethylamine, triethylamine, and the like; ketone or keto alcohol such as acetone, diacetone alcohol, and the like; ether such as tetrahydrofuran, dioxane, and the like; pyrrolidones such as 2-pyrrolidone, N-methyl-2-pyrrolidone, N-hydroxyethyl-2-pyrrolidone, and the like; a nitrogen-containing heterocyclic compound such as 1,3-dimethylimidazolidinone, ε-caprolactam, and the like; a sulfur-containing compound such as dimethyl sulfoxide, sulforan, thiodiethanol, and the like; and the like. Of these humectants, polyhydric alcohols such as alkylene glycol, glycerin, and the like may be suitable.

The amount of the humectant in the ink usually ranges from 0 wt. % to about 95 wt. %, often from about 10 wt. % to about 80 wt. %, or from about 10 wt. % to about 50 wt. %, based on the total weight of the ink. Humectants may be used alone, or two or more kinds may be used in combination.

Examples of penetrants include, but are not limited to, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like.

The amount of the penetrant in the ink usually ranges from 0 wt. % to about 20 wt. %, often from about 0.1 wt. % to about 15 wt. %, or from about 1 wt. % to about 10 wt. %, based on the total weight of the ink. When an excessive amount of penetrant is present, the penetrability of the ink to recording paper may become too high, which may cause blurring. Penetrants may be used alone, or two or more kinds may be used in combination.

The ink may contain, if necessary, conventionally known additives, for example, a viscosity modifier such as polyvinyl alcohol, polyvinyl pyrrolidone, water-soluble resin, and the like; a surface tension modifier; a pH modifier; and the like.

The ink may be prepared by adding, if necessary, water, a water-soluble organic solvent and other additives, to the copper phthalocyanine pigment, the thiazole compound, and the metallic phthalocyanine compound in which ammonium ion ($NH_4^+$) and/or organic ammonium ion accounts for about 2 mol % to about 20 mol % of the counter ions.

As described above, the ink may be prepared by dissolution, dispersion, or mixture of the components according to a conventional method. The copper phthalocyanine pigment, dispersant and water are mixed with a disperser (for example, a ball mill, a sand mill, an attritor, a roll mill, an agitator mill, a Henschel mixer, a colloid mill, an ultrasonic wave homogenizer, a jet mill, an ang mill, and the like) to prepare a homogeneous pigment dispersion. Subsequently, additives such as water, a humectant, a penetrant, a viscosity modifier, a surface tension modifier, a pH modifier, a preservative, a mildew proofing agent, and the like are added to the dispersion and thoroughly dissolved to prepare an ink solution. After sufficiently stirring, the ink solution is filtered to remove coarse particles and foreign matters causing clogging, whereby ink-jet recording ink may be obtained.

EXAMPLE

The following examples are provided only to illustrate certain aspects of the description and are not intended to embody the total scope of the invention or any aspects thereof. Variations of the examples below are intended to be included within the scope of the invention.

Examples 1 to 9, and Comparative Examples 1 to 6

Inks for ink-jet recording was prepared by homogeneously mixing the ink composition summarized in Table 1. Counter ions other than ammonium ion in the metallic phthalocyanine compound were monovalent metal ions such as lithium ion, sodium ion, potassium ion, and the like.

In the measurement of ammonium ions in the metallic phthalocyanine compound, DX-500 series (manufactured by Nippon Dionex K.K.) was used. In the measurement, Ion-Pac® CG16 (manufactured by Nippon Dionex K.K.) was used as the separation column, the temperature of the thermostatic chamber was 45° C., CMMS III 4 mm (manufactured by Nippon Dionex K.K.) was used as the suppressor.

<<Evaluation>>

Each of the inks was tested and evaluated for storage stability (filtration test), ejecting stability, durable ejecting stability, a mildew proofing property, a rust preventing property, precipitation of rubber, glossiness, and ozone resistance as described below. The results obtained are summarized in Table 1.

<Storage Stability (Filtration Test)>

After 100 ml of the ink was sealed in a glass container and allowed to stand in a thermostatic chamber at 60° C. for 14 days, 50 ml of the ink was filtered through a hydrophilic membrane filter having a pore size of 1.0 µm. The presence of precipitate on the membrane filter was observed visually and with a microscope. Evaluation was carried out according to the following criteria.

A: Precipitates were not present on the membrane filter.
C: Precipitates were present on the membrane filter.

<Ejecting Stability>

The ink was filled in a predetermined ink cartridge, installed in an ink-jet printer-mounted digital multifunction device (DCP-110C, manufactured by Brother Industries, Ltd.), and continuous printing of one hundred million dots (about thirty thousand sheets) was performed. Evaluation was carried out according to the following criteria.

AA: Non-ejection and ejection bending were not observed at all in continuous printing.
A: Non-ejection or ejection bending was slightly observed in continuous printing, and both non-ejection and ejection bending were recovered within five purges.
C: Conspicuous non-ejection and ejection bending were observed in continuous printing, and both non-ejection and ejection bending were not recovered within five purges.

<Durable Ejecting Stability>

After the above ejecting stability test, an ink-jet printer-mounted digital multifunction device (DCP-110C) was allowed to stand as it was in the thermostatic chamber at 60° C. for two weeks, and then again continuous printing of one hundred million dots (about thirty thousand sheets) was performed. Evaluation was carried out according to the following criteria.

AA: Non-ejection and ejection bending were not observed at all in continuous printing.
A: Non-ejection or ejection bending was slightly observed in continuous printing, and both non-ejection and ejection bending were recovered within five purges.
C: Conspicuous non-ejection and ejection bending were observed in continuous printing, and both non-ejection and ejection bending were not recovered within five purges.

<Mildew Proofing Property>

Food stamps for bacterial examination (for viable bacterial count and for fungi)(manufactured by NISSUI PHARMACEUTICAL CO., LTD.) were uncapped, and sufficient amount of the ink was coated on the surface of agar media. The media were allowed to stand for 10 hours while being uncapped to accelerate adhesion of bacteria. The media were then capped, and the food stamp for viable bacterial count was cultured in a thermostatic chamber at 36° C. for two days, and the food stamp for fungi was cultured in a thermostatic chamber at 23° C. for five days. Evaluation was carried out by visual observation according to the following criteria.

A: Mildews were not generated.
C: Mildews were generated.

<Rust Preventing Property>

The metallic member used in the ink-jet head was processed to a strip-shape of 50 mm length, 10 mm width, and 2 mm thickness to produce a metallic member sample, and a sample piece of the produced metallic member sample was immersed in 10 ml of the ink in a sealed container, and allowed to stand in a thermostatic chamber at 60° C. for 2 weeks. After that, the immersed sample piece of metallic member sample was taken out and observed visually and with a microscope. Evaluation was carried out according to the following criteria.

AA: Coloring and corrosion were not observed at all.
A: Slight coloring was observed, but corrosion was not observed.
C: Coloring and corrosion were observed.

<Precipitation of Rubber>

A rubber sample processed to a strip-shape of 50 mm length, 10 mm width, and 2 mm thickness was immersed in 10 ml of the ink in a sealed container, and allowed to stand in a thermostatic chamber at 60° C. for 2 weeks. After that, the immersed sample was taken out. All the amount of the ink after the sample was taken out was filtered through an electroformed filter (a pore size: 13 µm, effective filtration area: 8 $cm^2$), and the time required for filtration was measured. As the control, ink alone to which a rubber sample was not immersed was allowed to stand on the same condition (60° C. for 2 weeks), filtered through an electroformed filter of the same specification as above, and the time required for filtration (standard time) was found. The ratio of the time required for filtration of the ink having immersed the rubber sample to the standard time was calculated, and evaluation was carried out according to the following criteria. Incidentally, from the observation of the electroformed filter after filtration with a microscope, it was confirmed that the ratio of the filtration time to the standard time was greater, the amount of precipitates were greater.

AA: The filtration time of less than 130% of the standard time was required.
A: The filtration time of 130% or more and less than 200% of the standard time was required.
B: The filtration time of 200% or more and less than 400% of the standard time was required.
C: The filtration time of 400% or more of the standard time was required.

<Glossiness>

The ink was filled in a predetermined ink cartridge, installed in an ink-jet printer-mounted digital multifunction device (DCP-110C, manufactured by Brother Industries, Ltd.), and solid printing was performed on photographic glossy paper (BP60GLA, manufactured by Brother Industries, Ltd.). Evaluation of the image quality was carried out by visual observation according to the following criteria.

A: The difference in glossiness was not observed between the solid printed part and the surrounding non-printed part, or slight difference in glossiness was felt but the solid printed part was not relieved and seen evenly.

B: The difference in glossiness was observed between the solid printed part and the surrounding non-printed part, and the solid printed part was seen a little in relief, but not problematic in practical use.

C: The great difference in glossiness was observed between the solid printed part and the surrounding non-printed part, and the solid printed part was seen in relief.

<Ozone Resistance>

The ink was filled in a predetermined ink cartridge, installed in an ink-jet printer-mounted digital multifunction device (DCP-110C, manufactured by Brother Industries, Ltd.), and printing evaluation was performed. First, as evaluation samples, gradation samples of cyan inks were printed on photographic glossy paper (BP60GLA, manufactured by Brother Industries, Ltd.) to produce patches of various OD (optical density) values. The patches were subjected to ozone resistance evaluation test with an ozone weather meter OMS-H (manufactured by Suga Test Instruments Co., Ltd.). The patches were allowed to stand on the condition of ozone concentration of 1 ppm, the temperature in the chamber of 24° C., and humidity in the chamber of 60% RH for 40 hours. Specifically, OD value after the ozone resistance evaluation test was measured of a color patch of a cyan color print part showing OD value of 1.0 before the test (however, in the case where ink whose OD value is less than 1.0, the maximum OD value). OD value was measured with Spectrolino (manufactured by Gretag Macbeth AG) (light source: $D_{65}$, angle of visibility: 2°, status A). By substituting the obtained measurement value (OD value after the test) for the following equation, the reduction rate of OD value to the OD value before the test was calculated.

[Reduction rate of OD value (%)]={[(OD value before the test)−(OD value after the test)]/(OD value before the test)}×100

The obtained reduction rate of OD value was evaluated according to the following evaluation criteria. When the reduction rate of OD value was less than 30%, ozone resistance performance in general use was judged as the level of eligibility.

AA: The reduction rate of OD value was less than 20%.

A: The reduction rate of OD value was 20% or more and less than 30%.

B: The reduction rate of OD value was 30% or more and less than 40%.

C: The reduction rate of OD value was 40% or more.

<Overall Quality>

Considering the above evaluation results, the inks were evaluated according to the following criteria.

G: All the evaluation results were AA or A.

NG: Any of the evaluation results was B or C.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Ink | | Amount of ammonium ions (mol %) in the counter ions in metallic phthalocyanine compound | 12.0 | 2.0 | 10.0 | 5.0 | 20.0 | 8.0 | 14.0 | 4.0 | 18.0 |
| | | Total amount of copper phthalocyanine pigment and metallic phthalocyanine compound (wt. %) | 4.0 | 2.0 | 4.5 | 5.0 | 3.0 | 0.1 | 2.5 | 4.0 | 1.5 |
| | | copper phthalocyanine pigment:metallic phthalocyanine compound | 90:10 | 95:5 | 95:5 | 90:10 | 90:10 | 80:20 | 80:20 | 70:30 | 70:30 |
| Ink Comp. (wt. %) | Copper phthalocyanine pigment | C.I. Pigment Blue 15:1 | — | 1.9 | — | — | 2.7 | — | — | 2.8 | — |
| | | C.I. Pigment Blue 15:3 | — | — | 4.275 | — | — | 0.08 | — | — | 1.05 |
| | | C.I. Pigment Blue 15:6 | 3.6 | — | — | 4.5 | — | — | 2.0 | — | — |
| | Metallic phthalocyanine compound | C.I. Direct Blue 86 | — | 0.1 | — | 0.5 | — | 0.02 | — | 1.2 | — |
| | | C.I. Direct Blue 199 | 0.4 | — | 0.225 | — | 0.3 | — | 0.5 | — | 0.45 |
| | Glycerin | | 27.0 | 27.0 | 27.0 | 27.0 | 27.0 | 27.0 | 27.0 | 27.0 | 27.0 |
| | Triethylene glycol butyl ether | | 5.0 | 5.0 | 5.0 | 5.0 | 5.0 | 5.0 | 5.0 | 5.0 | 5.0 |
| | Benzotriazole | | — | 0.1 | 0.1 | 0.1 | 0.1 | 0.1 | 0.1 | 0.1 | 0.1 |
| | Styrene-acrylic acid copolymer | | 3.6 | 1.9 | 4.275 | 4.5 | 2.7 | 0.08 | 2.0 | 2.8 | 1.05 |
| | OLFINE ® E1010[1] | | 0.2 | 0.2 | 0.2 | 0.2 | 0.2 | 0.2 | 0.2 | 0.2 | 0.2 |
| | Proxel XL-2 (S) (thiazole compound)[2] | | 0.2 | 0.2 | 0.2 | 0.2 | 0.2 | 0.2 | 0.2 | 0.2 | 0.2 |
| | Water | | Balance | Balance | Balance | Balance | Balance | Balance | Balance | Balance | Balance |
| Evaluation | Storage stability (filtration test) | | A | A | A | A | A | A | A | A | A |
| | Ejecting stability | | AA | AA | AA | AA | AA | AA | AA | AA | AA |
| | Durable ejecting stability | | A | AA | AA | AA | A | AA | AA | AA | A |
| | Mildew proofing property | | A | A | A | A | A | A | A | A | A |
| | Rust preventing property | | A | AA | AA | AA | AA | AA | AA | AA | AA |
| | Precipitation of rubber | | AA | AA | AA | AA | A | AA | AA | AA | A |
| | Glossiness (printing on glossy paper) | | A | A | A | A | A | A | A | A | A |
| | Ozone resistance | | AA | AA | AA | AA | AA | AA | AA | A | A |
| | Reduction rate of OD value (%) | | 12 | 6 | 7 | 11 | 13 | 19 | 18 | 22 | 24 |
| | Overall quality | | G | G | G | G | G | G | G | G | G |

| | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Ink | | Amount of ammonium ions (mol %) in the counter ions in metallic phthalocyanine compound | 0 | 0.8 | 30.0 | — | 10.0 | 10.0 |

TABLE 1-continued

|  |  |  | | | | | | |
|---|---|---|---|---|---|---|---|---|
| | Total amount of copper phthalocyanine pigment and metallic phthalocyanine compound (wt. %) | | 4.0 | 4.0 | 4.0 | 4.0 | 4.0 | 4.0 |
| | copper phthalocyanine pigment:metallic phthalocyanine compound | | 80:20 | 80:20 | 80:20 | 100:0 | 0:100 | 80:20 |
| Ink Comp. (wt. %) | Copper phthalocyanine pigment | C.I. Pigment Blue 15:1 | — | 3.2 | — | — | — | 3.2 |
| | | C.I. Pigment Blue 15:3 | — | — | 3.2 | — | — | — |
| | | C.I. Pigment Blue 15:6 | 3.2 | — | — | 4.0 | — | — |
| | Metallic phthalocyanine compound | C.I. Direct Blue 86 | 0.8 | — | 0.8 | — | — | 0.8 |
| | | C.I. Direct Blue 199 | — | 0.8 | — | — | 4.0 | — |
| | Glycerin | | 27.0 | 27.0 | 27.0 | 27.0 | 27.0 | 27.0 |
| | Triethylene glycol butyl ether | | 5.0 | 5.0 | 5.0 | 5.0 | 5.0 | 5.0 |
| | Benzotriazole | | 0.1 | 0.1 | 0.1 | 0.1 | 0.1 | — |
| | Styrene-acrylic acid copolymer | | 3.2 | 3.2 | 3.2 | 4.0 | — | 3.2 |
| | OLFINE ® E1010[1] | | 0.2 | 0.2 | 0.2 | 0.2 | 0.2 | 0.2 |
| | Proxel XL-2 (S) (thiazole compound)[2] | | 0.2 | 0.2 | 0.2 | 0.2 | 0.2 | — |
| | Water | | Balance | Balance | Balance | Balance | Balance | Balance |
| Evaluation | Storage stability (filtration test) | | C | C | A | C | A | A |
| | Ejecting stability | | C | C | AA | C | AA | A |
| | Durable ejecting stability | | C | C | C | C | AA | C |
| | Mildew proofing property | | A | A | A | A | A | C |
| | Rust preventing property | | AA | AA | AA | AA | AA | C |
| | Precipitation of rubber | | AA | AA | C | AA | AA | AA |
| | Glossiness (printing on glossy paper) | | A | A | A | C | A | A |
| | Ozone resistance | | AA | AA | AA | AA | C | AA |
| | Reduction rate of OD value (%) | | 17 | 18 | 18 | 2 | 64 | 17 |
| | Overall quality | | NG | NG | NG | NG | NG | NG |

[1]Acetylene glycol type surfactant; active ingredient amount is 100 wt %; manufactured by Nissin Chemical Industry Co., Ltd.
[2]Aqueous dipropylene glycol solution containing 1,2-benzisothiazolin-3-one (20 wt %); manufactured and sold by Arch Chemicals Inc.

<Consideration of the Results Obtained in Examples and Comparative Examples>

In the ink in Example 1 (the total amount of the copper phthalocyanine pigment and the metallic phthalocyanine compound (hereinafter referred to as the total amount of phthalocyanines) is 4.0 wt. %), 12.0 mol % of the counter ions of C.I. Direct Blue 199 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Further, because the ink contained Proxel XL-2(S) of a thiazole compound not containing an anticorrosive agent, slight coloring was observed due to the immersion of the metallic member but did not result in corrosion, and caused no other problems. Further, because the amount of the ammonium ion of the counter ions of C.I. Direct Blue 199 was 12.0 mol %, there was no precipitation of components from the rubber member. Because the amount of C.I. Direct Blue 199 in the total amount of phthalocyanines was 10%, glossiness in printing on glossy paper was good. The amount of C.I. Pigment Blue 15:6 of a copper phthalocyanine pigment having good ozone resistance accounted for 90% in the total amount of phthalocyanines, the ink had good ozone resistance.

In the ink in Example 2 (the total amount of phthalocyanines=2.0 wt. %), 2.0 mol % of the counter ions of C.I. Direct Blue 86 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Further, because the ink contained benzotriazole as the rust preventive, corrosion of the metallic members did not occur. Further, because the amount of the ammonium ion of the counter ions of C.I. Direct Blue 86 was 2.0 mol %, there was no precipitation of components from the rubber member. Because the amount of C.I. Direct Blue 86 in the total amount of phthalocyanines was 5%, glossiness in printing on glossy paper was good. The amount of C.I. Pigment Blue 15:1 of a copper phthalocyanine pigment having good ozone resistance accounted for 95% in the total amount of phthalocyanines, the ink had good ozone resistance.

In the ink in Example 3 (the total amount of phthalocyanines=4.5 wt. %), 10.0 mol % of the counter ions of C.I. Direct Blue 199 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Because the ink contained benzotriazole as the anticorrosive agent, corrosion of the metallic members did not occur. Further, because the amount of the ammonium ion of the counter ions of C.I. Direct Blue 199 was 10.0 mol %, there was no precipitation of components from the rubber member. Because the amount of C.I. Direct Blue 199 in the total amount of phthalocyanines was 5%, glossiness in printing on glossy paper was good. The amount of C.I. Pigment Blue 15:3 of a copper phthalocyanine pigment having good ozone resistance accounted for 95% in the total amount of phthalocyanines, the ink had good ozone resistance.

In the ink in Example 4 (the total amount of phthalocyanines=5.0 wt. %), 5.0 mol % of the counter ions of C.I. Direct Blue 86 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Because the ink contained benzotriazole as the anticorrosive agent, corrosion of the metallic members did not occur. Further, because the amount of the ammonium ion of the counter ions of C.I. Direct Blue 86 was 5.0 mol %, there was no precipitation of components from the rubber member. Because the amount of C.I. Direct Blue 86 in the total amount of phthalocyanines was 10%, glossiness in printing on glossy paper was good. The amount of C.I. Pigment Blue 15:6 of a copper phthalocyanine pigment having good ozone resistance accounted for 90% in the total amount of phthalocyanines, the ink had good ozone resistance.

In the ink in Example 5 (the total amount of phthalocyanines=3.0 wt. %), 20.0 mol % of the counter ions of C.I. Direct Blue 199 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Further, because the ink contained benzotriazole as the anticorrosive agent, corrosion of the metallic members did not occur. Because the amount of the ammonium ion of the counter ions of C.I. Direct Blue 199 was 20.0 mol %, there was very little precipitation of components from the rubber member. Because the amount of C.I. Direct Blue 199 in the total amount of phthalocyanines was 10%, glossiness in printing on glossy paper was good. The amount of C.I. Pigment Blue 15:1 of a copper phthalocyanine pigment having good ozone resistance accounted for 90% in the total amount of phthalocyanines, the ink had good ozone resistance.

In the ink in Example 6 (the total amount of phthalocyanines=0.1 wt. %), 8.0 mol % of the counter ions of C.I. Direct Blue 86 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Because the ink contained benzotriazole as the anticorrosive agent, corrosion of the metallic members did not occur. Further, because the amount of the ammonium ion of the counter ions of C.I. Direct Blue 86 was 8.0 mol %, there was no precipitation of components from the rubber member. Because the amount of C.I. Direct Blue 86 in the total amount of phthalocyanines was 20%, glossiness in printing on glossy paper was good. The amount of C.I. Pigment Blue 15:3 of a copper phthalocyanine pigment having good ozone resistance accounted for 80% in the total amount of phthalocyanines, the ink had good ozone resistance.

In the ink in Example 7 (the total amount of phthalocyanines=2.5 wt. %), 14.0 mol % of the counter ions of C.I. Direct Blue 199 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was free from the generation of mildews. Because the ink contained benzotriazole as the anticorrosive agent, corrosion of the metallic members did not occur. Further, because the amount of the ammonium ion of the counter ions of C.I. Direct Blue 199 was 14.0 mol %, there was no precipitation of components from the rubber member. Because the amount of C.I. Direct Blue 199 in the total amount of phthalocyanines was 20%, glossiness in printing on glossy paper was good. The amount of C.I. Pigment Blue 15:6 of a copper phthalocyanine pigment having good ozone resistance accounted for 80% in the total amount of phthalocyanines, the ink had good ozone resistance.

In the ink in Example 8 (the total amount of phthalocyanines=4.0 wt. %), 4.0 mol % of the counter ions of C.I. Direct Blue 86 of a metallic phthalocyanine compound is ammonium ion, so that precipitates were not generated and the ink was stably ejected from start to finish. The contained Proxel XL-2(S) of a thiazole compound as the mildew proofing agent, so that the ink was free from the generation of mildews. Because the ink contained benzotriazole as the anticorrosive agent, corrosion of the metallic members did not occur. Further, because the amount of the ammonium ion of the counter ions of C.I. Direct Blue 86 was 4.0 mol %, there was no precipitation of components from the rubber member. Because the amount of C.I. Direct Blue 86 in the total amount of phthalocyanines was 30%, glossiness in printing on glossy paper was good. The amount of C.I. Pigment Blue 15:1 of a copper phthalocyanine pigment having good ozone resistance accounted for 70% in the total amount of phthalocyanines, the ink had good ozone resistance.

In the ink in Example 9 (the total amount of phthalocyanines=1.5 wt. %), 18.0 mol % of the counter ions of C.I. Direct Blue 199 of a metallic phthalocyanine compound was ammonium ion, so that precipitates were not generated and the ink was stably ejected from start to finish. The ink contained Proxel XL-2(S) of a thiazole compound as the mildew proofing agent, so that the ink was good and free from the generation of mildews. Because the ink contained benzotriazole as the anticorrosive agent, corrosion of the metallic members did not occur. Further, because the amount of the ammonium ion of the counter ions of C.I. Direct Blue 199 was 18.0 mol %, there was very little precipitation of components from the rubber member. Because the amount of C.I. Direct Blue 199 in the total amount of phthalocyanines was 30%, glossiness in printing on glossy paper was good. The amount of C.I. Pigment Blue 15:3 of a copper phthalocyanine pigment having good ozone resistance accounted for 70% in the total amount of phthalocyanines, the ink had good ozone resistance.

In the ink in Comparative Example 1 (the total amount of phthalocyanines=4.0 wt. %), Proxel XL-2(S) of a thiazole compound was contained as the mildew proofing agent, so that the ink was free from the generation of mildews. Because the ink contained benzotriazole as the anticorrosive agent, corrosion of the metallic members did not occur. Because ammonium ion and organic ammonium ion were not contained in C.I. Direct Blue 86 as the counter ions, there was no precipitation of components from the rubber member. The amount of C.I. Direct Blue 86 in the total amount of phthalocyanines was 20%, so that glossiness in printing on glossy paper was good. The amount of C.I. Pigment Blue 15:6 of a copper phthalocyanine pigment having good ozone resistance accounted for 80% in the total amount of phthalocyanines, so that the ink had good ozone resistance. However, because ammonium ion and organic ammonium ion as the counter ions were not contained in C.I. Direct Blue 86 of a metallic phthalocyanine compound, precipitation was not restrained and precipitates were generated. Therefore, the ink was not stably continuously ejected.

In the ink in Comparative Example 2 (the total amount of phthalocyanines=4.0 wt. %), Proxel XL-2(S) of a thiazole compound was contained as the mildew proofing agent, so that the ink was free from the generation of mildews. Because the ink contained benzotriazole as the anticorrosive agent, corrosion of the metallic members did not occur. Because the amount of the ammonium ion of the counter ions of C.I. Direct Blue 199 was 0.8 mol %, there was no precipitation of components from the rubber member. The amount of C.I. Direct Blue 199 in the total amount of phthalocyanines was 20%, so that glossiness in printing on glossy paper was good. The amount of C.I. Pigment Blue 15:1 of a copper phthalocyanine pigment having good ozone resistance accounted for 80% in the total amount of phthalocyanines, so that the ink had good ozone resistance. However, the amount of the ammonium ion of the counter ions of C.I. Direct Blue 199 was 0.8 mol %, so that precipitation was not restrained and precipitates were generated. Therefore, the ink was not stably continuously ejected.

In the ink in Comparative Example 3 (the total amount of phthalocyanines=4.0 wt. %), 30.0 mol % of the counter ions of C.I. Direct Blue 86 was ammonium ion, so that precipitates were not generated and ink was stably ejected immediately after feeding of ink. The ink contained Proxel XL-2(S) of a thiazole compound as the mildew proofing agent, so that the ink was free from the generation of mildews. Further, because the ink contained benzotriazole as the anticorrosive agent, corrosion of the metallic members did not occur. Because the amount of C.I. Direct Blue 86 in the total amount of phthalocyanines was 20%, glossiness in printing on glossy paper was good. The amount of C.I. Pigment Blue 15:3 of a copper phthalocyanine pigment having good ozone resistance accounted for 80% in the total amount of phthalocyanines, the ink had good ozone resistance. However, the amount of the ammonium ion of the counter ions of C.I. Direct Blue 86 was 30.0 mol %, which led to precipitation of components from the rubber member. The ink was not stably ejected after the durability test.

In the ink in Comparative Example 4 (the total amount of phthalocyanines=4.0 wt. %), Proxel XL-2(S) of a thiazole compound was contained as the mildew proofing agent, so that the ink was free from the generation of mildews. Because the ink contained benzotriazole as the anticorrosive agent, corrosion of the metallic members did not occur. Because a metallic phthalocyanine compound was not present, there was no precipitation of components from the rubber member. However, the ink in Comparative Example 4 was the ink using C.I. Pigment Blue 15:6 of a copper phthalocyanine pigment alone, so that precipitation was not restrained and precipitates were generated. Therefore, the ink was not stably continuously ejected. Further, the difference in glossiness was great between the printed part and the non-printed part when printing on glossy paper, and the printed part was relieved.

In the ink in Comparative Example 5 (the total amount of phthalocyanines=4.0 wt. %), 10.0 mol % of the counter ions of C.I. Direct Blue 199 was ammonium ion, so that precipitates were not generated and the ink was stably ejected from start to finish. The ink contained Proxel XL-2(S) of a thiazole compound as the mildew proofing agent, so that the ink was free from the generation of mildews. Further, because the ink contained benzotriazole as the anticorrosive agent, corrosion of the metallic members did not occur. Because the amount of the ammonium ion of the counter ions of C.I. Direct Blue 199 of a metallic phthalocyanine compound was 10.0 mol %, there was no precipitation of components from the rubber member. The ink in Comparative Example 5 was the ink using C.I. Direct Blue 199 alone, so that glossiness in printing on glossy paper was good. However, C.I. Direct Blue 199 was inferior in ozone resistance, so that ozone resistance of the ink was insufficient.

In the ink in Comparative Example 6 (the total amount of phthalocyanines=4.0 wt. %), 10.0 mol % of the counter ions of C.I. Direct Blue 86 was ammonium ion, so that precipitates were not generated and the ink was stably ejected immediately after feeding of ink. Because the ink did not contain an anticorrosive agent, the metallic members were corroded. The amount of the ammonium ion of the counter ions of C.I. Direct Blue 86 was 10.0 mol %, so that there was no precipitation of components from the rubber member. The amount of C.I. Direct Blue 86 in the total amount of phthalocyanines was 20%, so that glossiness in printing on glossy paper was good. The amount of C.I. Pigment Blue 15:1 of a copper phthalocyanine pigment having good ozone resistance accounts for 80% in the total amount of phthalocyanines, so that the ink had good ozone resistance. However, because the ink did not contain a mildew proofing agent, mildews were generated and the ink was not stably continuously ejected due to the presence of the mildews.

The invention is not limited to the embodiments described in the Examples, which are provided for illustrative purposes only. The material substances, their amounts used, and the conditions of producing them may be varied and modified without departing from the spirit and the scope of the invention as described and claimed herein.

What is claimed is:

1. An ink for ink-jet recording comprising a thiazole compound and a copper phthalocyanine pigment,
   wherein the ink further comprises a metallic phthalocyanine compound having one or more counter ions,
   wherein about 2 mol % to about 20 mol % of the counter ions is selected from the group consisting of ammonium ions, organic ammonium ions, and combinations thereof.

2. The ink according to claim 1, wherein a total amount of the copper phthalocyanine pigment and the metallic phthalocyanine compound is from about 0.1 wt. % to about 5 wt. % based on the total weight of the ink.

3. The ink according to claim 1, wherein a weight ratio of the copper phthalocyanine pigment to the metallic phthalocyanine compound is from about 70:30 to about 95:5.

4. The ink according to claim 1, wherein the copper phthalocyanine pigment is C.I. Pigment Blue 15:x, wherein x is an integer of 1 to 6.

5. The ink according to claim 4, wherein the copper phthalocyanine pigment is selected from the group consisting of C.I. Pigment Blue 15:1, C.I. Pigment Blue 15:3, C.I. Pigment Blue 15:6, and combinations thereof.

6. The ink according to claim 1, wherein the metallic phthalocyanine compound is a copper phthalocyanine dye.

7. The ink according to claim 6, wherein the copper phthalocyanine dye is C.I. Direct Blue 86.

8. The ink according to claim 6, wherein the copper phthalocyanine dye is C.I. Direct Blue 199.

9. The ink according to claim 8, wherein the C.I. Direct Blue 199 has a structure represented by General Formula (1):

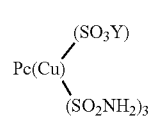

General Formula (1)

wherein Y represents a counter ion selected from the group consisting of a hydrogen ion, a lithium ion, a sodium ion, a potassium ion, an ammonium ion, and an organic ammonium ion; and Pc(Cu) represents a copper phthalocyanine nucleus represented by General Formula (2):

General Formula (2)

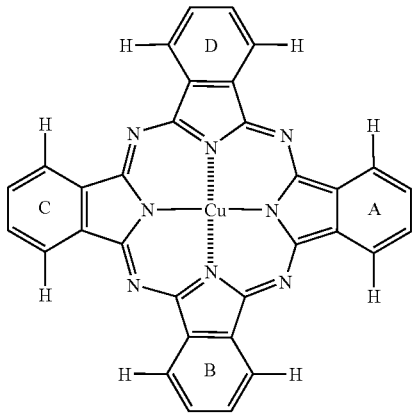

wherein SO$_3$Y group and each SO$_2$NH$_2$ group is present on any of the four benzene rings A, B, C and D in the copper phthalocyanine nucleus.

10. The ink according to claim 1, wherein the ink further comprises a benzotriazole compound.

11. The ink according to claim 10, wherein the benzotriazole compound is selected from the group consisting of 1H-benzotriazole, 4-methyl-1H-benzotriazole, 5-methyl-1H-benzotriazole, sodium salts thereof, and potassium salts thereof.

12. The ink according to claim 10, wherein the amount of the benzotriazole compound is from about 0.01 wt. % to about 0.5 wt. % based on the total weight of the ink.

13. The ink according to claim 1, wherein the thiazole compound is selected from the group consisting of benzisothiazoline, isothiazoline, 1,2-benzisothiazoline-3-one, 5-chloro-2-methyl-4-isothiazolin-3-one, 2-(thiocyanomethylthio)benzothiazole, 2-mercaptobenzothiazole, 3-allyloxy-1,2-benzisothiazole-1,1-oxide, and combinations thereof.

14. The ink according to claim 1, wherein the amount of the thiazole compound ranges from about 10 ppm to about 500 ppm based on the total weight of the ink.

15. A method of improving mildew resistance in an ink for ink-jet recording comprising a thiazole compound and a copper phthalocyanine pigment, the method comprising adding to the ink a metallic phthalocyanine compound having one or more counter ions wherein about 2 mol % to about 20 mol % of the counter ions is selected from the group consisting of ammonium ions, organic ammonium ions, and combinations thereof.

16. The method according to claim 15, wherein a total amount of the copper phthalocyanine pigment and the metallic phthalocyanine compound is from about 0.1 wt. % to about 5 wt. % based on the total weight of the ink.

17. The method according to claim 15, wherein the metallic phthalocyanine compound is a copper phthalocyanine dye.

18. A method of avoiding the formation of precipitates in an ink for ink-jet recording comprising a thiazole compound and a copper phthalocyanine pigment, the method comprising adding to the ink a metallic phthalocyanine compound having one or more counter ions wherein about 2 mol % to about 20 mol % of the counter ions is selected from the group consisting of ammonium ions, organic ammonium ions, and combinations thereof.

19. The method according to claim 18, wherein a total amount of the copper phthalocyanine pigment and the metallic phthalocyanine compound is from about 0.1 wt. % to about 5 wt. % based on the total weight of the ink.

20. The method according to claim 18, wherein the metallic phthalocyanine compound is a copper phthalocyanine dye.

* * * * *